April 22, 1969   W. LAI   3,439,612
HYBRID FLARE

Filed Nov. 14, 1966

WILLIAM LAI
*INVENTOR.*

BY *[signature]*

ATTORNEY

WILLIAM LAI
INVENTOR.

United States Patent Office 3,439,612
Patented Apr. 22, 1969

3,439,612
HYBRID FLARE
William Lai, Los Altos, Calif., assignor to United Aircraft Corporation, East Hartford, Conn., a corporation of Delaware
Filed Nov. 14, 1966, Ser. No. 594,127
Int. Cl. C06d 1/10
U.S. Cl. 102—37.8                    6 Claims

ABSTRACT OF THE DISCLOSURE

A hybrid flare system wherein a liquid oxidizer is directed onto an exposed unenclosed burning surface of a fuel material. Highest radiant energy emissions occur at oxidizer to fuel ratios above 2.5.

Background of the invention

This invention relates to flares and more particularly to flares employing hybrid propellant systems.

The term "hybrid" when used with respect to gas generators or rocket motors refers to a bipropellant system having a solid and a liquid component. In most cases the solid propellant component is a fuel grain comprised of a cured polymer which may also contain combustion modifiers and seed materials for producing specific spectral characteristics and the liquid propellant component is a reactive liquid oxidizer such as oxygen, fuming nitric acid or interhalogen compounds. It is also possible to have a reverse hybrid system which employs a solid oxidizer such as ammonium perchlorate and a liquid fuel such as hydrazine.

Flare systems have been proposed utilizing hybrid rocket motors as the source of radiant energy for such applications as towed targets for infrared homing missiles or as high intensity light sources. Such systems have restart capability and the spectral characteristics of the flare can be controlled by seeding the grains with materials having a particular desired emission spectrum. In such systems the exhaust plume of the hybrid rocket motor acts as the source of the radiant energy.

I have found that in such systems a substantial portion of the combustion process occurs within the combustion chamber and the radiant energy produced thereby is not available for utilization. Further, the regression rate of the solid grain in the combustion chamber is higher than desirable for flare purposes where long-burning times are desired.

It is accordingly an object of this invention to provide a hybrid flare system which utilizes substantially all radiant energy generated in the combustion process.

It is another object of this invention to provide a long-burning hybrid flare with a low regression rate.

These and other objects of this invention will be readily apparent from the following description with reference to the accompanying drawings wherein.

Description of the invention

Figure 1:
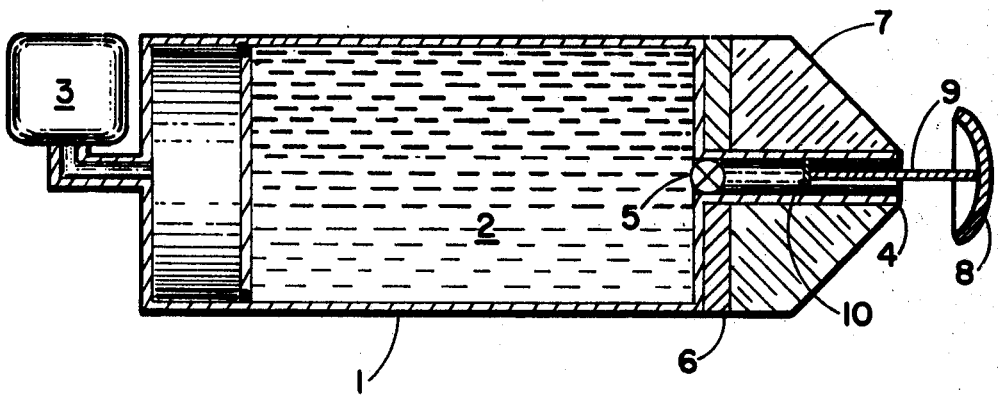
FIG. 1 is a cross sectional view of a one embodiment flare according to this invention.

The flares of this invention achieve the aforementioned objects by providing means for reacting the propellant components in the open without any combustion chamber thereby effectively utilizing all the radiant energy which is available from both the burning surface and the combustion gases. Referring now to FIG. 1, a flare according to this invention comprises a tank 1 containing a liquid propellant component 2. Tank 1 contains a sliding partition 3 for positive expulsion of liquid 2 and is connected at one end to a source of pressurized gas 3. The other end of tank 1 is provided with an outlet pipe having flow control valve 5 which is preferably a remote actuated valve. An insulating material 6 is mounted over the end of tank 1 around outlet pipe 4, and a solid propellant components grain 7 is mounted over insulation 6 and around pipe 4. A deflector plate 8 is suspended from shaft 9 and held in place in front of outlet pipe 4 by means of spider 10. The system as shown is designed to function with a hybrid propellant system in which the fuel and oxidizer are hypergolic. If non-hypergolic materials are used an igniter will also have to be provided. Various ignition systems which may be and are known to the act, a simple and preferable system being an oxygen-methane flame directed onto the surface of grain 7 which flame is removed when combustion is established.

In operation, valve 5 is opened permitting liquid 2 to flow through pipe 4 into deflector plate 8, which directs the liquid 2 over the surface of grain 7. Combustion occurs over the entire exposed surface of grain 7, which permits utilization of the radiant energy produced at both the burning surface and in the combustion gas plume. Further, since the combustion is occurring substantially at ambient pressures the regression rate of the grain is quite low as compared to the regression rate within a combustion chamber.

Figure 2:
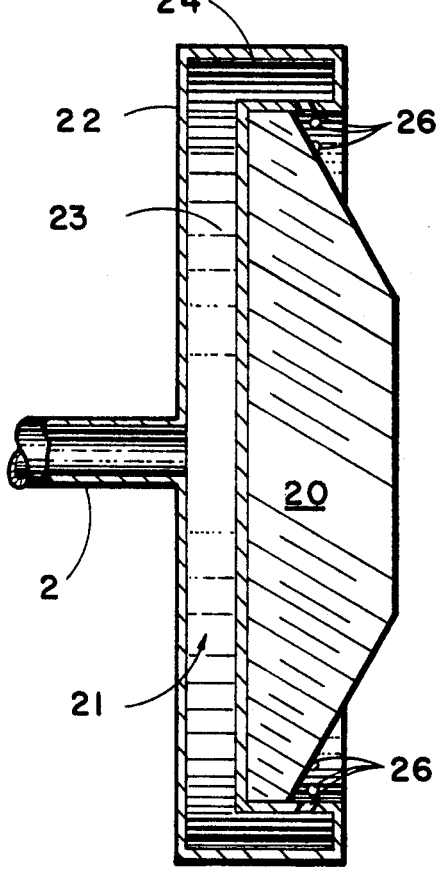
FIG. 2 is a cross sectional view of the injector and grain assembly of another embodiment of this invention and, FIG. 3 is a graph showing the effect of oxidizer-fuel on radiancy in a flare according to this invention.

The embodiment of FIG. 1 shows central injection of the liquid, however other injection designs can also be used. In FIG. 2 a flare employing circumferential injection is shown. A solid grain 20 is mounted on an injector 21 comprising a wall 22 defining a fluid passage 23 and a circumferential manifold 24. The inner wall portion of manifold 24 is provided with a plurality of injector ports 26 arranged to direct fluid over the surface of grain 20. A pipe 27 connects injector 21 to a source of liquid propellant component as in FIG. 1. In operation the liquid propellant component is sprayed through orifices 26 and combustion is produced over substantially the entire exposed surface of grain 20.

It has been found in practice that the flares of this invention operate to produce the greatest intensity radiation at oxidizer-fuel ratios (O/F) substantially higher than those which produce maximum intensity in a rocket motor type flare.

Figure 3:
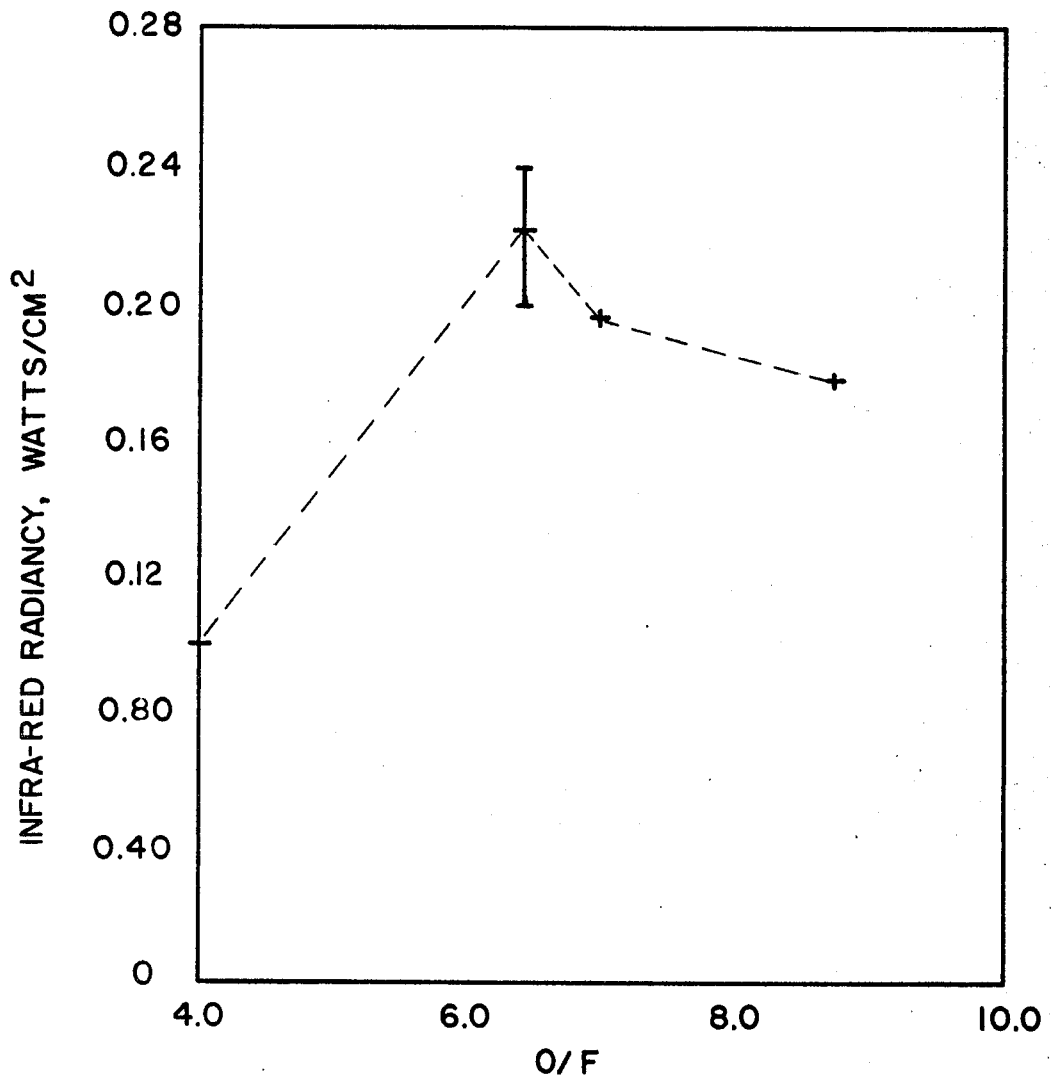

For example, a flare according to this invention may comprise liquid oxygen as the oxidizer and a fuel grain comprising 82% polybutadiene and 18% $CsNO_3$. The oxidizer is injected onto the surface of the grain which is inclined 45° with respect to the axis of the injector. A methane-oxygen flame is used to ignite the grain. The infra red flux at a point 2 feet from and perpendicular to the injector is shown in FIG. 3.

As can be seen the maximum intensity occurs at an O/F of approximately 6.25. In a comparable rocket motor system the maximum flame temperature occurs at an O/F of about 2.5. The fuel regression rate in the above system is approximately 0.001" per second as compared to about 0.01" per second for a comparable rocket motor system.

While this invention has been described with respect to specific embodiments thereof it should not be construed as being limited thereto. Various modifications can be made without departing from the scope of this invention which is limited only by the following claims wherein I claim:

1. A hybrid flare system comprising a solid propellant component grain having an exposed exterior burning surface unenclosed by any combustion chamber and means for directing a liquid propellant component capable of combusting said solid propellant component onto said burning surface.

2. The hybrid flare of claim 1 wherein said solid propellant component grain comprises the fuel component of a bi-propellant system and said liquid propellant component comprises the oxidizer component of a bipropellant system.

3. The hybrid flare of claim 1 wherein said solid propellant component grain is provided with a passage extending through said grain and said burning surface, and said means for directing said liquid propellant component onto said burning surface comprises liquid conducting means extending through said passage and deflector means downstream of said burning surface and in fluid receiving relationship to said liquid conducting means whereby liquid flowing through said liquid conducting means is directed over said burning surface after impingement on said deflector means.

4. The hybrid flare of claim 1 wherein said means for directing liquid propellant component onto said exposed exterior burning surface comprises an injector having a peripherally extending wall defining a solid grain receiving recess and a plurality of injector orifices extending through said wall whereby a plurality of streams of liquid propellant component may be injected across said recess, and said solid propellant component grain is mounted in said grain receiving recess.

5. In a process for generating radiant energy wherein a liquid oxidizer is directed onto the surface of a solid fuel grain whereby combustion is caused to occur at the surface of said solid fuel grain, the improvement wherein said surface is an exposed surface unenclosed by any combustion chamber and said oxidizer flow rate is selected to produce an O/F of at least 2.5.

6. The process of claim 5 wherein said O/F is in the range of 4 to 9.

References Cited

UNITED STATES PATENTS

| 2,990,682 | 7/1961 | Mullaney | 60—251 |
| 3,128,599 | 4/1964 | Carr | 60—235 |
| 3,144,751 | 8/1964 | Blackman et al. | 60—228 |
| 3,164,093 | 1/1965 | Holzman et al. | 60—251 |
| 3,178,885 | 4/1965 | Loughran | 60—251 |
| 3,289,412 | 12/1966 | Iwanciow | 60—251 |

ROBERT F. STAHL, *Primary Examiner.*

U.S. Cl. X.R.

67—1; 102—101